(12) United States Patent
Segal et al.

(10) Patent No.: US 7,302,849 B2
(45) Date of Patent: Dec. 4, 2007

(54) METHOD AND SYSTEM FOR MONITORING OF FLUID-FILLED DOMAINS IN A MEDIUM BASED ON INTERFACE WAVES PROPAGATING ALONG THEIR SURFACES

(75) Inventors: Arkady Segal, Moscow (RU); Marc Jean Thiercelin, Ville d'Avray (FR); Christian Besson, Le Pecq (FR)

(73) Assignee: Schlumberger Technology Corporation, Ridgefield, CT (US)

( * ) Notice: Subject to any disclaimer, the term of this patent is extended or adjusted under 35 U.S.C. 154(b) by 250 days.

(21) Appl. No.: 10/935,504

(22) Filed: Sep. 7, 2004

(65) Prior Publication Data

US 2005/0246131 A1 Nov. 3, 2005

(30) Foreign Application Priority Data

Apr. 23, 2004 (RU) .............................. 2004112559

(51) Int. Cl.
*G01N 29/04* (2006.01)
*G01V 1/053* (2006.01)
*E21B 47/00* (2006.01)

(52) U.S. Cl. ............................ 73/597; 598/602; 702/6; 166/250.1

(58) Field of Classification Search .................. 73/597, 73/598, 600, 602, 152.51, 152.39; 166/250.1, 166/308.1; 367/32; 702/6
See application file for complete search history.

(56) References Cited

U.S. PATENT DOCUMENTS 3,965,982 A   6/1976 Medlin (Continued)

FOREIGN PATENT DOCUMENTS

EP     1400818 A2    3/2004
GB    2 060 903 A    5/1981

OTHER PUBLICATIONS

F L Paillet and J E White (1982) Acoustic modes of propagation in the borehole and their relationship to rock properties, Geophysics, V47 N8, 1215-1228.

(Continued)

*Primary Examiner*—Hezron Williams
*Assistant Examiner*—Jacques M. Saint-Surin
(74) *Attorney, Agent, or Firm*—Vincent P. Loccisano; Jody Lynn DeStefanis; Dale Gaudier

(57) ABSTRACT

The invention relates to monitoring of fluid-filled domains in various media including, for example, subterranean formations, construction elements, bones. Claimed are a method for determining characteristic sizes of a fluid-filled crack in a medium and a system for implementation thereof. In accordance with this method, oscillations of the fluid-filled crack are registered. Wave characteristics of standing interface waves propagating along the fluid-filled crack surfaces are determined based on the registered oscillations taking medium and fluid properties into account. The fluid-filled crack characteristic sizes are calculated based on the determined wave characteristics of the standing interface waves. Also claimed are methods for detecting creation or existence of a fluid-filled crack in a medium, for hydraulic fracturing in a subterranean formation, for detecting cessation of propagation of a fluid-filled crack in a medium, as well as a method for determining properties of a fluid filling a layer in a medium, of the medium and of the layer. Analysis of oscillations of fluid-filled domains based on interface waves propagating along their surfaces underlies all the methods listed above. The proposed methods, by virtue of the simplicity of data processing inherent thereto, can be implemented in real time.

17 Claims, 6 Drawing Sheets

U.S. PATENT DOCUMENTS

| | | | |
|---|---|---|---|
| 4,432,078 | A | 2/1984 | Silverman |
| 4,779,200 | A | 10/1988 | Bradbury et al. |
| 4,783,769 | A | 11/1988 | Holzhausen |
| 4,802,144 | A | 1/1989 | Holzhausen et al. |
| 4,858,130 | A | 8/1989 | Widrow |
| 5,093,811 | A | 3/1992 | Mellor et al. |
| 5,170,378 | A | 12/1992 | Mellor et al. |
| 5,206,836 | A | 4/1993 | Holzhausen et al. |
| 5,220,504 | A | 6/1993 | Holzhausen et al. |
| 5,623,421 | A | 4/1997 | Savic |
| 5,947,200 | A * | 9/1999 | Montgomery ............... 166/281 |
| 6,724,687 | B1 | 4/2004 | Stephenson et al. |
| 6,814,141 | B2 * | 11/2004 | Huh et al. .................. 166/249 |
| 6,863,128 | B2 * | 3/2005 | Pandey et al. ........... 166/250.1 |
| 7,100,688 | B2 * | 9/2006 | Stephenson et al. ..... 166/250.1 |

OTHER PUBLICATIONS

V.Ferrazini and K. Aki, Slow waves trapped in a fluid-filled infinie crack: implications for volcanic tremor, J. Geophys. Res., 92 No B9, 9215-9223, 1987.

B. Chouet, Dynamics of a fluid-driven crack in three dimensions by the finite-difference method, J. Geophys. Res., 91, 13, 967-13, 992, 1986.

Partial differential equations toolbox for use with Matlab, Users Guide, The Math Works Inc., 1997.

Reservoir Stimulation, Third Edition, Eds. M. J. Economides and K. G. Nolte, John Wiley & Sons, Ltd, 2000, chapter 6, pp. 6-1 to 6-49.

D. Barree, M.K. Fisher, R.A. Woodroof, "*A practical guide to hydraulic fracture diagnostic technologies*", SPE 77442, submitted in Annual Technical Conference and Exhibition, San-Antonio, Texas, USA, Sep. 28, 2002-Oct. 2, 2002.

*Theoretical Physics. vol. 6: Hydrodynamics,* Landau L.D., Livshitz E.M., $4^{th}$ ed., Moscow, Fizmatlit, 1988, chapter I, p. 13-70 for non-viscous fluid.

*Theoretical Physics. vol. 6: Hydrodynamics,* Landau L.D., Livshitz E.M., $4^{th}$ ed., Moscow, Fizmatlit, 1988, chapter II, p. 71-136 for viscous Newtonian fluid.

Surjaatmadja et al., "Analysis of Generated and Reflected Pressure Waves during Fracturing Reveals Fracture Behavior", SPE 77598, 2002.

* cited by examiner

METHOD AND SYSTEM FOR MONITORING OF FLUID-FILLED DOMAINS IN A MEDIUM BASED ON INTERFACE WAVES PROPAGATING ALONG THEIR SURFACES

FIELD OF THE INVENTION

The invention relates in general to monitoring of fluid-filled domains in a medium, and in particular—to detection and tracking the evolution of fluid-filled domains in a medium, as well as to determination of characteristic sizes and properties thereof based on interface waves propagating along their surfaces.

BACKGROUND OF THE INVENTION

The term "fluid-filled domain", as used herein, refers to a generalized notion for any fluid-filled hollow in a continuous medium. In particular, fluid-filled hollows include cracks, layers, faults, fractures and ruptures. The term "monitoring", as used herein, refers to a generalized notion for actions on detecting, observing, predicting, analyzing or determining basic characteristics.

The present invention is applicable for wide variety of media (in particular, subterranean formations, construction elements, bones) and fluids (in particular, water, oil).

Monitoring of fluid-filled cracks is of great importance in various fields of human activity, for example, in extractive industry, medicine, construction engineering. Fluid-filled cracks in a medium can be both desirable and undesirable. Desirable fluid-filled cracks comprise artificially-made cracks, for example, hydraulic fractures intended for improving efficiency of oil production or for ore-body preconditioning in mining industry. Undesirable fluid-filled cracks comprise, in particular, large-scale natural subterranean cracks in the vicinity of cities and industrial objects, cracks in building constructions and bones.

In oil industry, hydraulic fracturing is widely used for improving well productivity by forming or extending channels from a wellbore to a reservoir. Hydraulic fractures are formed by hydraulically injecting a fracturing fluid into the wellbore under pressure. As a result, in a subterranean formation one or more tensile cracks are formed and filled with fluid, which normally leads to enhancement of oil production from the reservoir.

A fracturing fluid comprises proppant, whose low-size particles are added to the fluid to maintain a fracture open after termination of the fluid injection and pressure release in order to create a high-capacity drainage layer in the formation. Particles of sand or ceramic material are usually used as the proppant particles. For efficiency of usage, the fracture should propagate within a producing formation and should not extend to adjacent strata, furthermore, the crack should have sufficient sizes. Therefore, determination of the fluid-filled crack characteristic sizes is an important stage in optimization of the production process.

Sometimes the proppant forms an impermeable pack in the vicinity of the fracture tip, as a result the fracture ceases to propagate ("tip screenout"). Detection of the moment of tip screenout is an issue for an operator, who is to detect the moment to stop further proppant pumping.

Monitoring of fluid-filled domains is also of great importance in the context of detection, tracking and determination of characteristic sizes of large-scale natural cracks in subterranean formations, which cracks can cause earth surface erosion, cracks in various building construction elements such as slabs or diverse piers, which cracks can cause destruction of such building construction elements, as well as in the context of exploration and determination of characteristics of fluid-filled subterranean layers.

Presently characteristic sizes of fluid-filled cracks are determined using various technologies and methods. The most widely used is the technique of indirect determination based on the analysis of the pressure variation characteristics in the process of development and production. This technique is disclosed in, for example, *Reservoir Stimulation*, Third Edition, M. J. Economides and K. G. Nolte (Ed.), Chichester, UK, Wiley, 2000. A more reliable technique is the technique of acoustic investigation of cracks, which is used in field environment and based on the event location using passive acoustic radiation. This technique is disclosed in, for example, D. Barree, M. K. Fisher, R. A. Woodroof, "*A practical guide to hydraulic fracture diagnostic technologies*", SPE 77442, submitted in Annual Technical Conference and Exhibition, San-Antonio, Tex., USA, 28.09.2002-02.10.2002.

Another technique for evaluation of the fluid-filled crack characteristic sizes consists in construction of a map of a free surface tilt. This technique is disclosed in the above-mentioned D. Barree, M. K. Fisher, R. A. Woodroof, "*A practical guide to hydraulic fracture diagnostic technologies*". It includes tracking the deformation field in a formation surrounding a crack using tilt-meters.

All the above techniques imply complex preprocessing of acquired data, which preprocessing is needed for further determination of the crack geometrical characteristics based on models. As a result, the data processing complexity does not enable to perform fast interpretation of measurements and strongly limits the capabilities for real-time determination of the crack geometrical characteristics.

From U.S. Pat. No. 5,206,836 known is a method for determination of characteristic sizes of a subterranean crack intersecting an existing well based on exciting oscillations in a fluid filling the crack on a resonance frequency, wherein parameters used in calculations depend on dynamical characteristics of the fluid and a subterranean formation, as well as on geometrical characteristics. The fluid-filled subterranean crack geometrical characteristics are determined by inverting the crack physical properties obtained by modeling with the use of the data of observations of fluid pressure in the well.

The result provided by said method is achieved by interpreting the registered oscillations of the fluid pressure in the crack based on waves propagating in the fluid within the crack. A more detailed description of advantages of the method according to the invention in comparison with the method of U.S. Pat. No. 5,206,836 is given below after a detailed disclosure of the method according to the invention.

Thus, at present time there is a need in the art in fast and robust methods for monitoring of fluid-filled domains, enabling to implement real-time monitoring.

SUMMARY OF INVENTION

An aspect of the invention is to provide an efficient method for determining characteristic sizes of fluid-filled cracks in a medium and a system for implementation thereof.

In accordance with this aspect, provided is a method for determining characteristic sizes of at least one fluid-filled crack in a medium, the method comprising the steps of registering oscillations of the at least one fluid-filled crack; determining wave characteristics of standing interface waves propagating along surfaces of the at least one fluid-filled crack based on the registered oscillations taking medium and fluid properties into account; calculating the characteristic sizes of the at least one fluid-filled crack based on the determined wave characteristics of the standing interface waves.

In one preferred embodiment, the medium is a subterranean formation, a crack mouth is adjacent to an injection well, and a crack width w is determined separately from other characteristic sizes thereof. The step of registering comprises registering fluid pressure oscillations in the injection well and selecting lowest resonance frequencies, corresponding to oscillations of the at least one fluid-filled crack. The step of determining comprises determining frequencies $v^{(n)}$ (n is integer) of the standing interface waves propagating along surfaces of the at least one fluid-filled crack as corresponding to the selected resonance frequencies of the at least one fluid-filled crack oscillations, and calculating an interface wave group velocity $V(v^{(n)},w)$, which depends on properties of a formation and the fluid. The step of calculating comprises calculating a characteristic size L along the standing interface wave propagation in accordance with the following formula $$\frac{L}{n} = \frac{V(v^{(n)}, w)}{2v^{(n)}}.$$

In another preferred embodiment, the medium is a fluid-submerged part of a construction element, the at least one fluid-filled crack intersects a surface of the construction element fluid-submerged part, a crack width is measured directly. The step of registering comprises clamping a transducer at the intersection of the at least one fluid-filled crack with a surface of the construction element fluid-submerged part, registering oscillations by said transducer, and selecting lowest resonance frequencies, corresponding to the at least one fluid-filled crack oscillations. The step of determining comprises determining frequencies $v^{(n)}$ (n is integer) of the standing interface waves propagating along surfaces of the at least one fluid-filled crack as corresponding to the selected resonance frequencies of the at least one fluid-filled crack oscillations, and calculating an interface wave group velocity $V(v^{(n)},w)$, which depends on the construction element and fluid properties. The step of calculating comprises calculating a characteristic size L along the standing interface wave propagation in accordance with the following formula $$\frac{L}{n} = \frac{V(v^{(n)}, w)}{2v^{(n)}}.$$

A system for determining characteristic sizes of at least one fluid-filled crack in a subterranean formation in accordance with the first preferred embodiment of the method of the invention comprises registration means for registering fluid pressure oscillations in an injection well; data processing means for determining frequencies of standing interface waves propagating along surfaces of the at least one fluid-filled crack, calculating an interface wave group velocity and calculating a characteristic size of the at least one fluid-filled crack along the standing interface wave propagation; and means for generating a signal comprising results of the calculations.

Another aspect of the invention is to provide a method for detecting creation or existence of fluid-filled cracks in a medium. In accordance with this aspect, provided is a method for detecting creation or existence of at least one fluid-filled crack in a medium, the method comprising the steps of registering oscillations of the medium; matching frequencies of the registered oscillations with available frequencies of the medium oscillations in the absence of fluid-filled cracks; detecting the creation or existence of at least one fluid-filled crack based on the presence of frequencies of the registered oscillations, which are significantly lower than the available frequencies of the medium oscillations. This method is advantageously applicable to such media as a subterranean formation, a construction element and a bone of a human being or an animal.

Yet another aspect of the invention is to provide a method enabling to improve efficiency of hydraulic fracturing in a subterranean formation. In accordance with this aspect, provided is a method for hydraulic fracturing in a subterranean formation, the method comprising the steps of pumping a fluid into an injection well with an adjustable pumping frequency for creation and propagation of at least one fluid-filled crack in the formation; providing a sudden fluid pressure change in the injection well; registering resonance frequencies of oscillations of the least one fluid-filled crack; adjusting the pumping frequency so that it matches one of the resonance frequencies of oscillations of the at least one fluid-filled crack.

Yet another aspect of the invention is to provide a method enabling to detect a moment when a fluid-filled crack ceases to propagate in a medium (tip screenout). In accordance with this aspect provided is a method for detecting cessation of propagation of a fluid-filled crack in a medium, the method comprising the steps of registering oscillations of the fluid-filled crack; real-time tracking a resonance frequency of the fluid-filled crack oscillations; detecting the cessation of the fluid-filled propagation by detecting a switch in the resonance frequency evolution from decreasing to increasing. This method is advantageously applicable to such media as a subterranean formation, a construction element and a bone of a human being or an animal.

Yet another aspect of the invention is to provide an efficient method enabling to determine properties of a fluid filling a layer in a medium, of the medium and of the layer. In accordance with this aspect, provided is a method for determining properties of a fluid filling a layer in a medium, of the medium and of the layer, the method comprising the steps of registering interface waves propagating along surfaces of the fluid-filled layer; determining wave characteristics of the registered interface waves; calculating the properties of the fluid, the medium and the fluid-filled layer based on the determined wave characteristics of the interface waves. This method is advantageously applicable for monitoring of subterranean water-bearing and oil-bearing layers.

One of the primary distinctive features of the claimed methods is characterized by performing interpretation of registered oscillations based on interface waves propagating along the surfaces of fluid filled domains, which, in particular, enables to implement efficient and reliable calculations of characteristic sizes and properties of fluid-filled domains in real time.

BRIEF DESCRIPTION OF THE DRAWINGS

The abovementioned and other features and advantages of the present invention are disclosed in the following description of the preferred embodiments thereof with references to the drawings, in which.

A DETAILED DESCRIPTION OF PREFERRED EMBODIMENTS OF THE INVENTION

In accordance with the aforesaid, determination of characteristic sizes of fluid-filled cracks is of great importance in various fields of human activity. Below, with a reference to FIG. 1, described is a method enabling to efficiently determine characteristic sizes of a fluid-filled crack in accordance with the invention.

Figure 1:
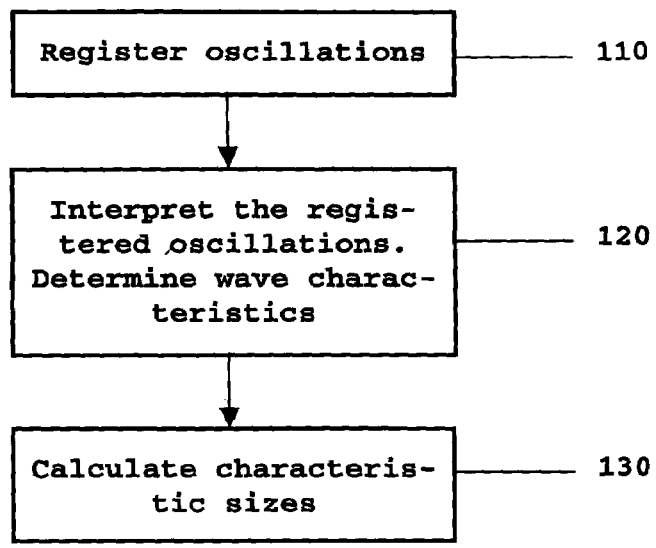
FIG. 1 is a flowchart of a method for determining characteristic sizes of fluid-filled cracks according to the invention.

In step 110 of FIG. 1 oscillations of a fluid-filled crack are registered. In particular, the oscillations can be excited in advance for subsequent registration thereof. The registration and excitation can be implemented by any suitable means known from the art. Several methods and means for exciting and registering the fluid-filled crack oscillations are described below in detail.

In step 120 of FIG. 1 the registered oscillations are interpreted based on standing interface waves propagating along the surfaces of the fluid-filled crack are determined based on the registered oscillations taking the medium and fluid properties into account. Throughout the description, the term "standing interface wave" denotes an approximate solution of equations of elastic medium comprising a fluid-filled crack of finite length L, said solution describing displacements of particles in the crack vicinity as $$u(x, y) \propto \sin\left(n\frac{\pi}{L}x\right)\sin(\omega t)\exp(-\kappa y),$$

where $\omega$ is frequency, $\kappa$ is the decay parameter, n is integer, x-axis is directed along the crack in the wave propagation direction, z-axis is directed along the crack perpendicularly to the wave propagation direction, and y-axis is directed across the crack. This solution equals 0 at the crack tips and harmonically varies along the crack. Owing to the presence of exponential decay across the crack, the corresponding solutions are localized in the vicinity of the fluid-medium interface. Such solutions are called the standing interface waves.

The interpretation of step 120 includes determining wave characteristics of standing interface waves propagating along the crack surfaces based on the fluid-filled crack oscillations registered in step 110. The wave characteristics of standing interface waves comprise, for example, frequencies, velocities, spectral density, etc. The wave characteristics being determined can depend on the medium and fluid properties (for example, on densities thereof, on the fluid viscosity, on the medium permeability, etc.). The medium and fluid properties, on which the wave characteristics of standing interface waves depend, should be either known in advance or determined by any known method separately from the steps of the method being described. Examples of dependencies of the wave characteristics of standing interface waves on the medium and fluid properties are presented below in description of preferred embodiments of this method.

In step 130 of FIG. 1 the characteristic sizes of the fluid-filled crack are calculated based on the wave characteristics of standing interface waves determined in step 120. The calculations are based on a correspondence between wavelengths of standing interface waves propagating along the surfaces of the fluid-filled crack and characteristic sizes thereof. Exemplary formulae for such correspondence are given below in description of preferred embodiments of the present invention.

The disclosed method, by virtue of simplicity of data processing (in particular, calculations) inherent thereto, can be implemented in real time. It also enables to determine characteristic sizes for more than one the fluid-filled cracks, which will be described below in description of preferred embodiments of said method.

Figure 2:
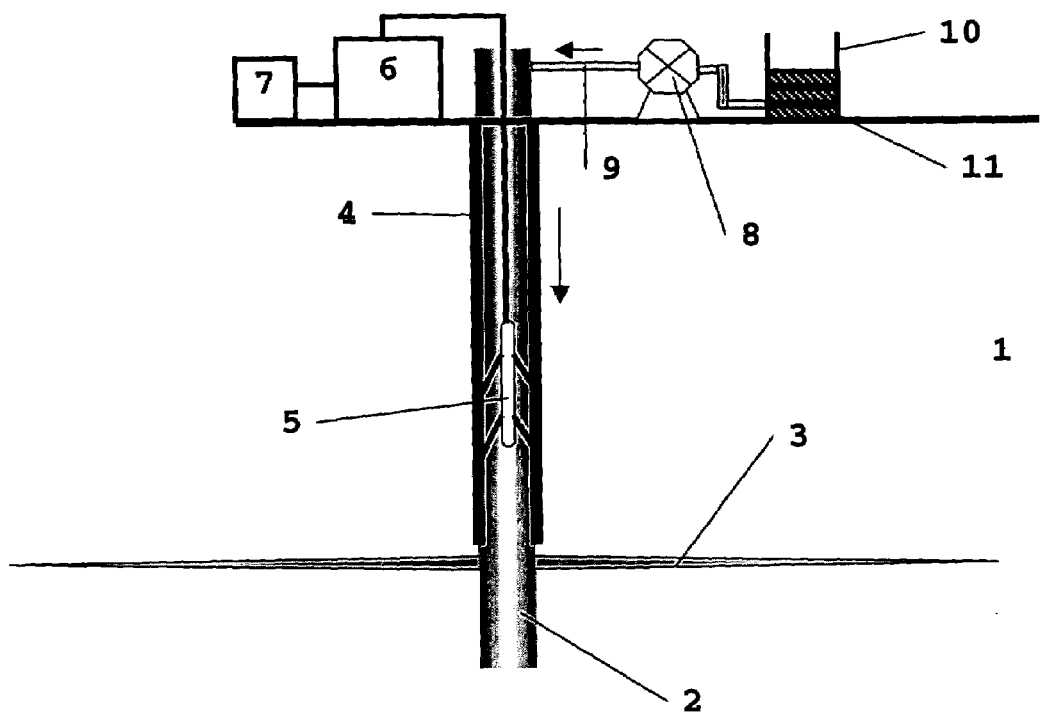
FIG. 2 schematically illustrates a system for practical implementation of a preferred embodiment of the method of FIG. 1.

One of the most preferred embodiments of the above method is determining characteristic sizes of a fluid-filled crack in a subterranean formation, wherein an injection well is provided. The crack mouth is adjacent to the injection well. Such a system depicted in FIG. 2 is typical for hydraulic fractures described above.

When registering the fluid-filled crack oscillations, registered are the fluid pressure oscillations in the injection well induced by the crack oscillations. Prior to registering, the fluid-filled crack oscillations are preferably excited by a sudden fluid pressure change in the injection well. One of the most evident methods for providing the sudden fluid pressure change in the injection well consists in a stop of pumping for several seconds. Any known suitable high-speed acquisition system (for example, 1 record per 5 ms or faster) can be employed for registering the fluid pressure oscillations in the injection well. In particular, the fluid pressure oscillations can be registered by one or more transducers clamped in the vicinity of the fluid-filled crack, for example, in the injection well.

Besides registering the fluid-filled crack oscillations by registering the fluid pressure oscillations in the injection well, known is a variety of techniques for registering the fluid-filled crack oscillations. In particular, the registration of the fluid-filled crack oscillations can be performed by registering any oscillations induced by the crack oscillations. The registration of the fluid-filled crack oscillations can be also performed or by observing any natural phenomena, induced by the crack oscillations, including:

a) gravitational phenomena leading to a change of the gravitational acceleration in the formation vicinity owing to large-scale displacement of strata (applications to monitoring of huge seismic-scale cracks are implied herein);

b) electromagnetic phenomena leading to excitation of electromagnetic field in the crack vicinity owing to both the motion of existing free charges in a medium and to division of bound charges;

c) seismo-electric phenomena representing generation of electromagnetic field in a medium owing to a change of the medium stressed state;

d) optical phenomena, for example, light generation in optical wave guides placed near the crack and sensitive to mechanical stresses in the medium;

e) electro-kinetic phenomena representing generation of electromagnetic field due to the fluid filtration in the crack and in pores of the medium;

d) thermodynamic phenomena like fluid-gas phase changes induced by the pressure oscillations in the crack vicinity.

Furthermore, the crack oscillations can be registered by observing any data acquired by measurements in the crack, such as, the data on formation permeability, formation electrical conductivity, etc.

According to one of the assumptions underlying the claimed method and confirmed experimentally, the crack characteristic size L divides exactly by wavelengths $\lambda^{(n)}$ of standing interface waves propagating along this characteristic size. In accordance with the aforesaid, the mentioned characteristic size can be determined by the following equation $$\frac{L}{n} = \lambda^{(n)} = \frac{V(v^{(n)}, w)}{2v^{(n)}}, \qquad (1)$$

where n is integer, $v^{(n)}$ is a frequency of n-th standing interface wave, $V(v^{(n)},w)$ is the interface wave group velocity, and w is the fluid-filled crack width. Equation (1) enables to determine more than one characteristic size of the fluid-filled crack since any crack dimension except width is characterized by its own set of standing interface waves with corresponding frequencies $v^{(n)}$.

The frequencies $v^{(n)}$ entering equation (1) are selected based on the fluid pressure oscillations induced by the fluid-filled crack oscillations and registered in the injection well. These frequencies correspond to the lowest resonance frequencies of the registered oscillations. The term "lowest resonance frequencies" used throughout the description corresponds to the appearance (for example, in spectrogram) of resonance frequencies significantly lower than the ones expected in the absence of fluid-filled cracks. At that, as simulation reveals, the lowest resonance modes of the crack oscillations are formed namely by standing interface waves propagating along the crack surfaces. An example of selecting the lowest resonance frequencies is presented hereinbelow.

The main wave characteristic of interface waves propagating along the fluid-filled crack surfaces, which is to be determined, is the interface wave group velocity $V(v^{(n)},w)$. Besides the width w of the crack considered, this velocity also depends on properties of the subterranean formation and fluid.

The group velocity $V(v^{(n)},w)$ can be determined either assuming, that the fluid is a non-viscous fluid (non-viscous fluid approximation), or assuming that the fluid is a viscous Newtonian fluid (viscous Newtonian fluid approximation). The terms "non-viscous fluid" and "viscous Newtonian fluid" used throughout the description are known from the art and described in detail in *Fluid Mechanics*, Landau L. D. and Lifshits E. M., 2nd ed., Reed Educational and Professional Publishing Ltd., 2000, pages 1-50 for non-viscous fluids, pages 44-92 for viscous Newtonian fluids.

Below the derivation of expressions for $V(v^{(n)},w)$ for each of the approximations is presented.

Derivation of the Expression for the Group Velocity in Non-viscous Fluid Approximation Displacements of particles corresponding to an interface wave form elliptical trajectories with amplitudes changing harmonically along the crack and decaying exponentially across the crack. The velocity of this wave is lower than the minimum of the elastic wave velocity in a fluid and the shear wave velocity in a formation. The interface wave velocity depends on frequency and is very low at low frequencies.

The phase velocity $c_{phase}$ of the interface wave propagating along crack surfaces for an infinite constant-width crack filled with a non-viscous fluid can be determined from the following dispersion relation derived in "*Slow waves trapped in a fluid-filled infinite crack: implications for volcanic tremor*", V. Ferrazini ᴎK. Aki, J. Geophys. Res., 1992, No B9, pg. 9215-9223, 1987

$$\cot\left(\frac{\omega w}{2c_{phase}}\kappa_f\right) - \frac{\rho\beta^4\kappa_f}{\rho_f c_{phase}^4 \kappa_\alpha}\left(\left(2 - \frac{c_{phase}^2}{\beta^2}\right)^2 - 4\kappa_\beta\kappa_\alpha\right) = 0, \qquad (2)$$

where ω is angular frequency, w is the crack width, ρ and $\rho_f$ are the formation and fluid densities, respectively, and $$\kappa_f = \sqrt{-1 + \frac{c_{phase}^2}{\alpha_f^2}} \quad \kappa_\alpha = \sqrt{-1 + \frac{c_{phase}^2}{\alpha^2}} \quad \kappa_\beta = \sqrt{-1 + \frac{c_{phase}^2}{\beta^2}},$$

where $\alpha_f$ is the elastic wave velocity in the fluid, α is the pressure elastic wave velocity in the formation and, β is the shear elastic wave velocity in the formation.

Herein $c_{phase}$ is the velocity of propagation of the wave along the crack. The wave, propagating along the crack surfaces, represents an ellipsoidal particle motion with an amplitude decaying exponentially across the crack, under the restriction that the particle motion is symmetric with respect to the crack axe.

Figure 3:
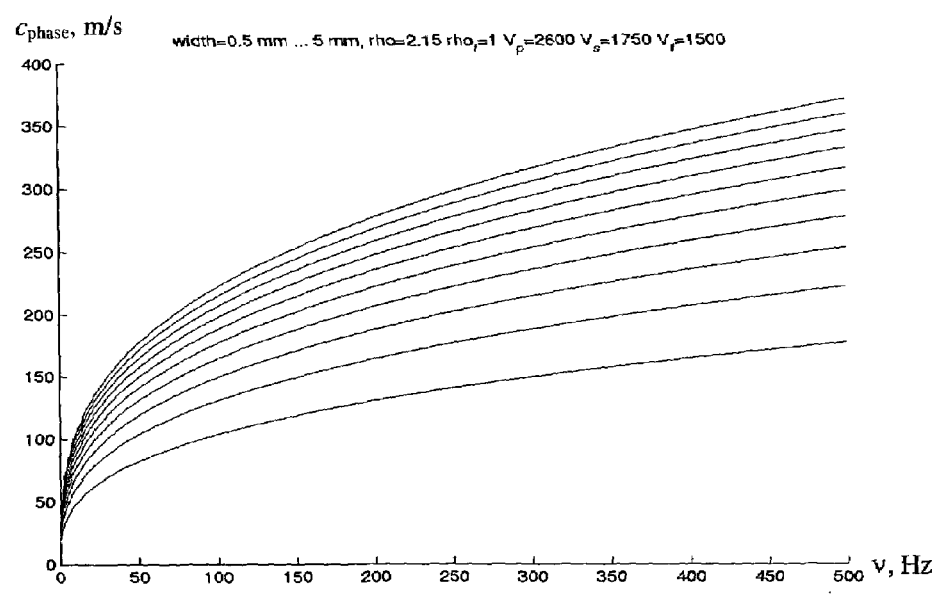
FIG. 3 shows dispersion curves for waves propagating along a crack.

Typical dispersion curves for the waves propagating along the crack surfaces are presented in FIG. 3.

These figures show solutions of equation (2) for various w (w=0.5 . . . 5 mm) and various frequencies v=ω/2π. A high-frequency asymptote for all the curves ('Scholte velocity') is close to the elastic wave velocity in the fluid. At zero frequency the velocity equals zero and this is the main explanation of all the principal phenomena considered.

In equation (2) one can use the approximation $\cot(x) \approx 1/x$ valid for small x. Replacing $\cot(x)$ by $1/x$ produces no essential changes in the velocity: for realistic crack widths (0.5 mm-50 mm) the error in the velocity is a fraction of mm/s.

In the limit $c_{phase} \ll \alpha_f$, which actually takes place for low frequencies and for small widths, it may be shown that a good approximation for the solution of equation (2) is $$c_{phase}^3 = \zeta vw, \zeta = 2\pi \frac{\rho}{\rho_f}\left(1 - \frac{\beta^2}{\alpha^2}\right)\beta^2. \quad (3)$$

The curves of FIG. 3 corresponding to exact solutions are in fact very similar to $c_{phase} \sim v^{1/3}$.

In the context of the present invention, one needs to calculate the interface wave group velocity V $$V(\omega) = c_{phase}^2 \bigg/ \left(c_{phase} - \omega \frac{dc_{phase}}{d\omega}\right), \quad (4)$$

but for interface waves propagating along the crack surfaces a good approximation exists, which follows from equations (3) and (4), namely $$V \approx \frac{3}{2} c_{phase}. \quad (5)$$

In the case of finite rectangular cracks, it is shown by numerical modeling that the lowest-frequency resonance modes correspond to interface waves propagating along crack surfaces, with a dispersion relation being a deformation of (2). It is observed the mentioned deformation becomes negligible in the limit of large aspect ratio 'length/width', which is always the case for cracks.

Derivation of the Expression for the Group Velocity in Viscous Newtonian Fluid Approximation In this subsection presented is the original derivation of the theory of interface waves propagating along crack surfaces for the viscous Newtonian fluid case.

For a viscous fluid-filled fracture, the dispersion relation is determined as follows.

First, formulated are the equations of motion, at that in the equations below summation over repeating indices is implied.

I. The equations of motion of a formation are formulated in terms of displacements $u^i$ (i=1, 2, 3) as follows $$\rho \ddot{u}^i = \tau^{ik}{}_{,k}, \tau^{ij} = \lambda \delta^{ij} e^k{}_k + 2\mu e^{ij}, e^{ij} = (\partial^i u^j + \partial^j u^i)/2,$$

where $\tau^{ij}$, $e^{ij}$ are tensors of stresses and deformations, respectively, $\lambda$, $\mu$ are the Lame coefficients, $\partial^i$ is a partial derivative with respect to $x_i$, $\delta_{ij}$ is the Kronecker symbol.

II. The equations of motion of a fluid are the linearized Navier-Stokes equations formulated in terms of fluid velocity $v^i$ as follows $$\rho_f \dot{v}^i = \tau^{ik}{}_{,k}, \tau^{ij} = \delta^{ij}(-p) + 2\eta \cdot \text{dev}(g^{ij}), g^{ij} = (\partial^i v^j + \partial^j v^i)/2,$$

$$\rho = \rho_f + \rho', \dot{\rho} + \partial^i(\rho v^i) = 0 \Rightarrow \dot{\rho}' + \rho_f \partial^i v_i = 0, p = \alpha_f^2 \rho',$$

where $\rho'(x)$ is the density fluctuation, $\rho_f$ is a constant background fluid density, $\alpha_f^2$ is the squared acoustic velocity, $\eta$ is the fluid viscosity, and $\text{dev}(g^{ij}) \equiv g^{ij} - \delta^{ij} g^{kk}/3$. A dot over a symbol denotes the time derivative of a corresponding variable. Both systems give rise to second-order equations. Specifically, in the fluid case one gets (taking a first time derivative of the equation $\rho_f \dot{v}^i = \tau^{ik}{}_{,k}$ and using the rest equations)

$$\rho_f \ddot{v}^i = \rho_f \alpha_f^2 \partial^i v_i + 2\eta \cdot \text{dev}(\dot{g}^{ij}).$$

III. Boundary Conditions

At the elastic medium-viscous fluid interface the following boundary conditions are to be satisfied:

$$\text{continuity of velocity } \dot{u}^i = v^i; \quad (6)$$

$$\text{continuity of traction } \tau_{medium}{}^{ik} = n_k = \tau_{fluid}{}^{ik} n_k, \quad (7)$$

where $n_k$ is a component of a vector normal to the elastic medium-viscous fluid interface.

The derivation of the dispersion relation is presented below. After formulating basic equations, introduced is the representation of the displacement and velocity vector fields via compression and shear potentials as follows $$u^i = \partial^i \Phi + \epsilon^{ijk} \partial^j \Psi^k, v^i = \partial^i \Phi_f + \epsilon^{ijk} \partial^j \Psi_f^k,$$

where $\epsilon^{ijk}$ is a completely antisymmetric tensor. Then a transition to frequency domain is performed by the Fourier transform with respect to time. By virtue of the equations of motion, the potentials satisfy the following equations $$\Delta \Phi = -\frac{\omega^2}{\alpha^2}\Phi, \Delta \Psi^i = -\frac{\omega^2}{\beta^2}\Psi^i,$$

$$\Delta \Phi_f = -\frac{\omega^2}{\alpha_f^2 - \frac{4i\omega\eta}{3\rho_f}}\Phi_f, \Delta \Psi_f^j = -\frac{i\omega\rho_f}{\eta}\Psi_f^j,$$

where $\Delta \equiv \partial^i \partial^i$, which implies that plane waves have the following form $$\Phi(\omega, x) = \exp(ik_i x^i)\phi(k) \qquad \vec{k}^2 = \frac{\omega^2}{\alpha^2} \quad (8)$$

$$\Psi^i(\omega, x) = \exp(il_i x^i)\psi(l) \qquad \vec{l}^2 = \frac{\omega^2}{\beta^2} \quad (9)$$

$$\Phi_f(\omega, x) = \exp(ir_i x^i)\phi_f(r), \quad r^2 = \frac{\omega^2}{\alpha_f^2 - \frac{4i\omega\omega}{3\rho_f}} \quad (10)$$

$$\Psi_f^i(\omega, x) = \exp(is_i x^i)\Psi_f^i(s) \qquad \vec{s}^2 = \frac{i\omega\rho_f}{\eta}. \quad (11)$$

It should be noted that all the wave vectors $k^i, l^i, r^i, s^i$ are complex.

In the situation in question, the solutions for formation and media are built as series in plane waves (8)-(11), where wave numbers $k^i, l^i, r^i, s^i$ should be chosen to satisfy the boundary conditions (6), (7).

Assuming the fracture propagates in x-y plane only, any solution is a combination of plane waves in this plane; owing to the x-y rotational symmetry it is sufficient to study the plane waves provided the wave vector has vanishing y-component. Thus, we restrict to the case with $$k^y = l^y = r^y = s^y = 0; u^y = v^y = 0; \Psi^x = \Psi^z = 0,$$

which leads to the following representation of the potentials $$\Phi_\pm = \Phi_{\pm 1} \exp(i(kx + k_z^\alpha z)) + \Phi_{\pm 2} \exp(i(kx - k_z^\alpha z))$$

-continued $$k_z^\alpha = \sqrt{\frac{\omega^2}{\alpha^2} - k^2}$$

$$\Phi_f = \Phi_{1f}\exp(i(kx + k_z^f z)) + \Phi_{2f}\exp(i(kx - k_z^f z))$$

$$k_z^f = \sqrt{\frac{\omega^2}{\alpha_f^2 - \frac{4i\omega\eta}{3\rho_f}} - k^2}$$

$$\Psi_\pm^y = \Psi_{\pm 1}^y \exp(i(kx + \kappa_z^\Psi z)) + \Psi_{\pm 2}^y \exp(i(kx - \kappa_z^\Psi z))$$

$$\kappa_z^\Psi = \sqrt{\frac{\omega^2}{\beta^2} - k^2}$$

$$\Psi_f^y = \Psi_{1f}^y \exp(i(kx + k_z^\Psi z)) + \Psi_{2f}^y \exp(i(kx - k_z^\Psi z))$$

$$k_z^\Psi = \sqrt{\frac{i\omega\rho_f}{\eta} - k^2},$$

where k∈C is an arbitrary complex number (wave number along x-direction), while Φ's and Ψ's are complex constants. "±" refers to formation domains above the crack (z≧w) and below the crack (z≦w).

We consider the case when $k_z^\alpha$ and $\kappa_z^\Psi$ have a non-vanishing imaginary part (for example for real ω and k it would mean $$c = \frac{\omega}{k} < \beta$$

which, without loss of generality, can be considered to be positive. Then one has to set $$\Phi_{+2} = \Phi_{-1} = \Psi_{+2}^y = \Psi_{-1}^y = 0,$$

in order to avoid infinite growth of a solution for infinite z. The boundary conditions (6), (7) are to be satisfied at two planes z=±w/2. As a result, one has 8 complex constants ($\Phi_{+1}, \Phi_{-2}, \Psi_{+1}^y, \Psi_{-2}^y, \Phi_{1f}, \Phi_{2f}, \Psi_{1f}^y, \Psi_{2f}^y$) and 8 independent bondary conditions—4 at each plane (2 for continuity of particle velocity and two for continuity of traction). The linear system is $$\|L\| \cdot \begin{pmatrix} \Phi_{+1}\exp(i(k_z^\alpha w/2)) \\ \Psi_{+1}^y\exp(i(\kappa_z^\Psi w/2)) \\ \Phi_{1f} \\ \Phi_{2f} \\ \Psi_{1f}^y \\ \Psi_{2f}^y \\ \Phi_{-2}\exp(-i(k_z^\alpha w/2)) \\ \Psi_{-2}^y\exp(-i(\kappa_z^\Psi w/2)) \end{pmatrix} = 0,$$

where matrix L of the linear system is expressed as follows $$\begin{pmatrix} -i\omega k & i\omega\kappa_z^\Psi & -kq & -k/q & k_z^\Psi b & k_z^\Psi/b & 0 & 0 \\ -i\omega k_z^\alpha & -i\omega k & -k_z^f q & k_z^f/q & -kb & -k/b & 0 & 0 \\ A & -2\mu k\kappa_z^\Psi & Bq & B/q & 2\eta kk_z^\Psi b & -\frac{2\eta kk_z^\Psi}{b} & 0 & 0 \\ -2\mu kk_z^\alpha & C & 2\eta kk_z^f q & -\frac{2\eta kk_z^f}{q} & \eta D_k b & \eta D_k/b & 0 & 0 \\ 0 & 0 & -k/q & -kq & k_z^\Psi/b & k_z^\Psi b & -i\omega k & -i\omega\kappa_z^\Psi \\ 0 & 0 & -k_z^f/q & k_z^f q & -k/b & -kb & i\omega k_z^\alpha & -i\omega k \\ 0 & 0 & B/q & Bq & \frac{2\eta kk_z^\Psi}{b} & 2\eta kk_z^\Psi b & A & 2\mu k\kappa_z^\Psi \\ 0 & 0 & \frac{2\eta kk_z^f}{q} & -2\eta kk_z^f q & \eta D_k/b & \eta D_k b & 2\mu kk_z^\alpha & C \end{pmatrix}$$

where $$A = -\left(\lambda\frac{\omega^2}{\alpha^2} + 2\mu(k_z^\alpha)^2\right), \quad C = -\mu(k^2 - (\kappa_z^\Psi)^2), \quad D_k = k^2 - (k_z^\Psi)^2,$$

$$B = \frac{i\rho_f \alpha_f^2 R}{\omega} + 2\eta((k_z^f)^2 - R/3), \quad R = \frac{\omega^2}{\alpha_f^2 - \frac{4i\omega\eta}{3\rho_f}},$$

$$q = \exp(ik_z^f w/2), \quad b = \exp(ik_z^\Psi w/2).$$

The first and the second rows of L correspond to continuity of displacements along x and z at z=w/2, the third and the fourth ones correspond to the continuity of traction at z=w/2. The fifth to eighth rows are analogous to the equations at z=−w/2.

For existence of a nonzero solution the determinant of the corresponding linear system must vanish, i.e.

det∥L∥=0, that yields the dispersion relation.

In the zero-viscosity case, one has to erase the first and the fifth rows as well as the fifth and the sixth columns of L and to set η=0 in the remaining part thereof. Then the above expression for matrix L provides two dispersion equations: one for anti-symmetric mode (when the fluid pressure is anti-symmetric with respect to z) and the other for symmetric mode (when pressure is symmetric with respect to z). The anti-symmetric mode is quite faster. Its dispersion curve starts above the elastic wave velocity in a fluid at low frequencies and then slowly decreases down to the Scholte velocity as the frequency grows. The symmetric mode dispersion relation coincides with equation (2).

In the nonzero viscosity case, the symmetric and anti-symmetric mode exist either. They are characterized by requirements that z-component of a displacement is either anti-symmetric with respect to the crack axis (symmetric case) or symmetric with respect to the crack axis (anti-symmetric case). These definitions are consistent with the governing equations in the sense they extract independent systems from the equations. In these subsystems normalization constants of the potentials are constrained as follows:

$$\Phi_{\pm 1} = \mp \Phi_{-2} \; \Psi_{+1}{}^y = \pm \Psi_{-2}{}^y \; \Phi_{1f} = \mp \Phi_{2f} \; \Psi_{1f}{}^y = \pm \Psi_{2f}{}^y,$$

where upper and lower signs refer to the symmetric and anti-symmetric modes, respectively. These constraints lead to the following two equations:

$$\det \| L_\pm \| = 0,$$

where $$L_\pm = \begin{pmatrix} -i\omega k & i\omega \kappa_z^\Psi & -kq_\pm & k_z^\Psi b_\mp \\ -i\omega k_z^\alpha & -i\omega k & -k_z^f q_\mp & -kb_\mp \\ A & -2\mu k \kappa_z^\Psi & Bq_\mp & 2\eta k k_z^\Psi b_\pm \\ 2\mu k \kappa_z^\alpha & C & 2\eta k k_z^f q_\mp & \eta(k^2 - (k_z^f)^2) b_\mp \end{pmatrix} \quad (12)$$

$$q_\pm = q \pm 1/q, \quad b_\pm = b \pm 1/b.$$

These equation can be solved numerically. A useful parameterization of the solution is $$\omega = 2\pi v + i\theta/v \quad k = 2\pi v/c - i\sigma c/v,$$

where v is frequency, c is phase velocity, θ is the time decay rate measured in the frequency units and σ is the spatial attenuation rate measured in the inverse wavelength units, all these parameters being real. The parameters θ and σ should be restricted to be negative. If they are positive the corresponding solutions should be discarded, since otherwise it would lead to exponential growth either in time or in the propagation direction. Another point is that it makes sense to consider only θ and σ which are less or comparable to 1, since otherwise temporal decay or attenuation makes the wave negligibly small for the time of one oscillation. Then the solution of equation (12) in the '+' case presents a two dimensional surface in the four-dimensional space (v, c, θ, σ), which can be considered as a two-dimensional extension of the zero-viscosity c(v) curve lying in the plane (v, c, 0, 0).

In accordance with the aforesaid, for realistic fractures of width significantly lower than 1 cm and for low (in the abovementioned meaning) oscillation frequencies, a good approximation of the exact expressions for the group velocity V is the following equation obtained by combining equations (3) and (5)

$$\left(\frac{2}{3}V\right)^3 = \varsigma vw, \quad \varsigma = 2\pi \frac{\rho}{\rho_f}\left(1 - \frac{\beta^2}{\alpha^2}\right)\beta^2. \quad (13)$$

The formation and fluid properties entering equation (13) are assumed to be known.

As follows from equations (1) and (13), the interface wave group velocity also depends on the crack width w. Width w of the crack is to be determined separately from its other characteristic sizes. In particular, the crack width can be determined by measurements performed, for example, by one or more tilt meters. Furthermore, the crack width can be determined based on any independent data. For example, the crack width w can be estimated based on matching a known volume $\text{Vol}_{pumped}$ of fluid pumped into the crack with a model estimation of the crack volume:

$$\chi \text{Vol}_{pumped} = \xi LHw, \quad (14)$$

where χ is the crack efficiency, ξ is a factor accounting for the crack geometry (chosen in such a way that the right-hand side of equation (14) equals the crack volume, for example ξ=1 for a rectangular crack, ξ=π/4 for an elliptical crack, etc.), while L and H are the crack length and height, respectively. During pumping, $\text{Vol}_{pumped}$ is known while H could be either estimated by equation (14) or obtained by measurements. Therefore, the crack width can be estimated by matching the abscissa and ordinate of the graph of $\text{Vol}_{pumped}$ versus w at a resonance frequency. Introducing the variable $$\Psi = \frac{\chi \text{Vol}_{pumped}}{\xi H} \quad (15)$$

and using equations (1), (13), (14) one gets the following expressions for width and length of the crack $$w = \left(\frac{3}{2}\right)^{-\frac{3}{4}} \varsigma^{-\frac{1}{4}} \Psi^{\frac{3}{4}} v^{\frac{1}{2}} \quad (16)$$

$$L = \left(\frac{3}{2}\right)^{\frac{3}{4}} \varsigma^{\frac{1}{4}} \Psi^{\frac{1}{4}} v^{-\frac{1}{2}}.$$

It should be noted, that uncertainty in determination of the crack shape, residing in the uncertainty in the factor ξ, provides no significant error for determination of the crack length. For example, the ratio of Ψ's corresponding to elliptical and rectangular crack geometry is $$\frac{\pi}{4} \approx 0.79,$$

which leads to the ratio of the corresponding crack length estimates performed by formula (16) equal to $$\left(\frac{\pi}{4}\right)^{1/4} \approx 0.94.$$

For the same reason, even 50% error in determination of the crack volume will lead to just 16% error in estimation of its length. The same can be said about the dependence of the crack length estimation on assumptions with respect to the crack effectiveness χ.

Hereinbelow described is a particular example of application of the method described above to a hydraulic fracture in a shallow well in the formation with the following elastic characteristics:

formation density $\rho = 2.7$ g/cm$^3$
shear wave velocity in the formation $\beta = 2575$ m/s
pressure wave velocity in the formation $\alpha = 3900$ m/s The pumped fluid is water.

The resulting fracture geometry estimated via tilt-meter imaging is as follows: the fracture is elliptical, sub-horizontal, the fracture half-length (i.e. a distance from the injection well to the fracture far edge) equals 55 m, the fracture half-height equals 46 m, and its width equals 2.5 mm.

Figure 4:
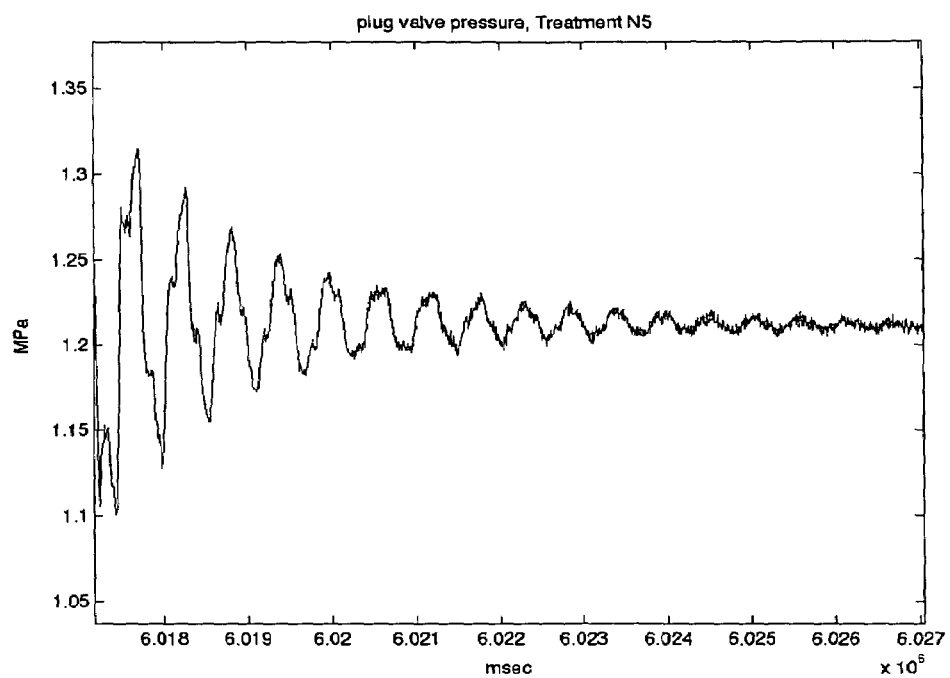
FIG. 4 illustrates the time dependence of fluid pressure registered in the preferred embodiment of the method of FIG. 1.

During a stop of pumping the fluid, a high-speed pressure acquisition system has been turned on both at the surface and down-hole. The time dependence of the registered fluid pressure is presented in FIG. 4.

Figure 5:
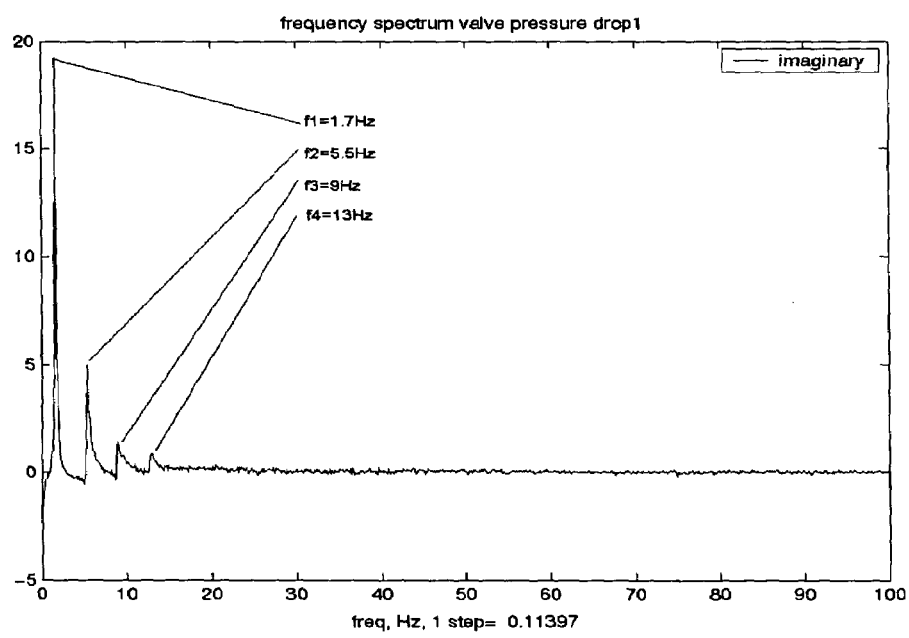
FIG. 5 shows a Fourier-image of the dependence of FIG. 3.

In FIG. 5 presented is the Fourier image of the above dependence (for simplicity, only the imaginary part is rendered, the real part being essentially similar to the imaginary one). In this spectrogram, a sharp sequence of four non-harmonic peaks is seen by a bare eye, i.e. the resonance peaks are identified without any further processing.

According to the method of the present invention, calculated is the "group" wavelength of the fracture interface waves, corresponding to a frequency of each peak, by dividing the interface wave group velocity by the mentioned frequency. For calculations used is the fracture width value measured by tilt-meters. The results of calculations are presented in Table 1.

TABLE 1

| Frequency, Hz | 'Group' wavelength, m |
|---|---|
| f1 = 1.7 | 55.0 |
| f2 = 5.5 | 26.0 |
| f3 = 9.0 | 18.7 |
| f4 = 13.0 | 14.7 |

From Table 1 one can see, that the wavelength associated with the lowest frequency (f1) equals 55 m, that is ½ length of the considered fracture. The next wavelength (associated with f2) approximately equals 55/2, the next one (associated with f3) is approximately equal to 55/3, and the last one (associated with f4) is approximately equal to 55/4. It follows, that wavelengths of standing interface waves are equal to integer fractions of the fracture length. The obtained results of calculations indicate correctness of the approach based on standing interface waves propagating along the fluid-filled fracture surfaces.

In accordance with the above example and equation (1), the maximum distance $L_{max}$ between the crack edges can be estimated as the characteristic size thereof in accordance with the following formula $$L_{max} = \frac{V(v_{min}, w)}{2v_{min}},$$

where $v_{min}$ is the lowest resonance frequency.

It should be noted, that simulations reveal that estimations of characteristic sizes of a fluid-filled crack in accordance with the described method are weakly sensitive to the crack width profile which is generally non-uniform. Therefore, the crack width w can be considered uniform when applying equations (1), (13), (14) to estimation of the crack characteristic sizes.

In principle, the set of resonance frequencies $v^{(n)}$ enables not only to determine characteristic sizes of a fluid-filled crack, but also to refine the formation and fluid properties. Since typically the number of sharp stand-alone peaks in each sequence can be large enough (3 to 10 and more), additional equations (1) can be employed to refine the formation and fluid properties, on which the group velocity $V(v^{(n)}, w)$ entering equation (1) depends. These properties include, in particular, the formation porosity and permeability, the fluid viscosity.

In the case when multiple fluid-filled cracks exist in a formation, for each crack one is to select an associated sequence of low-frequency resonance peaks from oscillations of fluid pressure registered in an injection well. This enables to determine characteristic sizes and to obtain additional information for each of the fluid-filled cracks.

The described preferred embodiment of the method according to the invention, by virtue of simplicity of the associated data acquisition and processing, can be implemented in real time. In the context of hydraulic fracturing, implementation of the method "in real time" means obtaining the necessary input data during the fracturing procedure or even faster.

The described preferred embodiment of the method according to the invention is applicable both to natural and artificially-made cracks. In particular, it is suitable for marine applications, when a subterranean formation comprises a shelf subterranean formation.

Hereinbelow, with a reference to FIG. 2, a system, in which the disclosed preferred embodiment of the method for determining characteristic sizes of fluid-filled cracks can be implemented, is described in general.

As follows from FIG. 2, mouth of the fluid-filled crack 3 is adjacent to the injection well 2 provided in the subterranean formation 1. The injection well 2 can have internal casing in the form of the casing pipe 4. Steel is most widely used as a material for casing pipes.

The system being described includes the registration means 5 clamped in the injection well 2 and intended for registering the fluid pressure oscillations in the injection well. In accordance with the aforesaid, the registering means 5 can represent any known registration means (for example, transducer) capable of registering pressure oscillations with high-speed (for example, 1 record per 5 ms or faster) and clamped in any suitable location (for example, in the vicinity of the crack mouth).

The registration means 5 provide the data on registered oscillations in the form of signals to the data processing means 6 arranged on the surface, transmission of the signals from the registration means 5 to the data processing means 6 being carried out by any known method (wired or wireless) in any form (analogous or digital) perceivable by the data processing means 6.

The data processing means 6 implement the basic steps of the method, i.e. determine the frequencies of standing interface waves propagating along the surfaces of the fluid-filled crack 3, calculate the interface wave group velocity (for example, in accordance with equation (13)) and calculate the characteristic size of the fluid-filled crack 3 along the standing interface wave propagation in accordance with equation (1). The exemplary embodiment of the data processing means 6 is described below in detail with reference to FIG. 6.

The data processing means 6 provide the calculation results to the means 7 for generating a signal, intended for generating a signal comprising results of the calculations performed by the data processing means 6. Though in FIG. 2 the signal generation means 7 are shown as a standalone device, the means 7 can be an integral part of the data processing means 6.

The generated signal is intended for further rendering the calculation results on a local or remote display device (not shown) including monitor, printer etc. In the case of providing the generated signal to a local display device, the signal generation means 7 can be an adapter (for example, video adapter). In the case of providing the generated signal to a remote display device or a remote storage device, the signal generation means 7 can be a network interface card, modem or any other device implementing transmission of the generated signal to the remote device. Transmission of the generated signal to remote devices can be carried out by any known method (wired or wireless) in any form (analogous or digital) supported by the signal generation means 7 and compatible with available communication medium. In particular, said signal can be communicated by satellites.

The described system preferably, but not necessarily, includes the pump 8 arranged on the surface and connected with the injection well 2 by the conduit 9. The pump 8 is also connected with the vessel 10 filled with the fluid 11. In operation the pump 8 injects the fluid into the injection well 2 through the conduit 9. The pump 8 can comprise the pressure control means (not shown) enabling to continuously increase and decrease the fluid pressure in the injection well 2, in particular, to perform sudden pressure release for short time in order to excite oscillations of the crack 3.

Hereinbelow, with a reference to FIG. 6, described is an exemplary embodiment of the processing means 6 of FIG. 2. In this exemplary embodiment the processing means 6 include the processing unit 61, RAM 62, the storage device 63, the conversion unit 64 and optionally the signal generation means 7. The conversion unit 64 receives the data on registered oscillations as signals from the registration means and converts such signals to the form suitable for further processing by the processing unit 61 and digitally storing in RAM 62 or the storage device 63. The storage device stores computer-executable instructions implementing the basic steps of the method described above, as well as data for computations associated with simulation, in particular, it can store data output by the conversion unit 64. The data output by the conversion unit can arrive directly to RAM 62. In operation of the data processing means 6, the storage device 63 provides the mentioned computer-executable instructions and data to RAM 62 for further execution and processing thereof by the processing unit 61. Then the processing unit 61 carries out calculations and provides results thereof to the signal generation means 7. The calculation results can be stored in the storage device 63 prior to sending to the signal generation means 7.

The data processing means 6 can represent any data processing means enabling to perform the steps coded as computer-executable instructions and corresponding to the preferred embodiment of the method according to the invention. For example, the data processing means 6 can be a personal computer, a server, a mainframe or the like. The processing unit 61 can represent one or more general-purpose or special-purpose processors. The storage device 63 can represent a hard disk drive, a drive for a magnetic or optical disk with an associated computer-readable medium or the like. It should be noted, that besides the described units and devices, the data processing means can also include other components.

In accordance with the aforesaid, from U.S. Pat. No. 5,206,836 known is a method for determination of characteristic sizes of a subterranean fluid-filled crack, referred to as a Hydraulic Impedance Test (HIT). The HIT method is based on the analysis of the fluid pressure oscillations in an injection well. Hereinbelow a comparative analysis of the method of the invention with the HIT method is presented, the principal differences between these two methods are explained and advantages of the method of the invention are described.

In the HIT method the system consisting of an injection well and a hydraulic fracture is considered as a one-dimensional hydrodynamic system, where the system parameters such as hydraulic impedance are functions of dynamic characteristics of the fluid and formation as well as of the system geometry. In accordance with the HIT method, based on the fluid pressure observations and assumptions about the fracture geometry one determines the fracture length, width and height by inverting theoretically derived capacitance, resistance and inertance. Leaving aside the theoretical derivation of the HIT method, it should be noted, however, that this method is based on several rough approximations of real physical processes.

In the HIT method the fracture response to the wellbore pressure changes (based on which is the fracture capacitance is determined) is treated to be uniform, such that the fracture expands and contracts without changing its shape ("fracture breathing"), just as a static solution governed by a time-dependent but spatially uniform pressure distribution along the fracture.

Furthermore, in the HIT method the use of an obscure frequency-independent quantity named "acoustic wave speed" (based on which the fracture resistance is determined) is controversial with the assumption of the uniform pressure distribution.

Let's suppose that an abrupt fluid pressure change is provided in the injection well. In accordance with the HIT method, this change causes the fracture expansion or contraction without any shape deviations in accordance with static approximation, wherein the pressure distribution uniform over the fracture volume is considered to be equal to pressure at the fracture mouth. At the same time, the pulses are considered to propagate through the fracture to the tip and back to the mouth with the "acoustic wave speed", which contradicts with the uniform pressure distribution along the fracture.

Then the same phenomena is considered based on the approach corresponding to the method of the invention and this method is compared with the HIT method. In accordance with the approach according to the invention, the pressure change at the fracture mouth leads to diverse elastic waves along the fracture, including waves in the fluid, pressure and shear waves in the formation and interface waves propagating along the fracture surfaces. For the fluid pressure oscillation sources characterized by low-frequency harmonics (up to kHz range) any fracture motion is a superposition of the elastic waves mentioned. In particular, the macroscopic expansion and contraction of the fracture (on which the HIT is based) is also a superposition of this kind.

Below it is proven that the HIT "fracture breathing" corresponds to the lowest frequency mode formed by the fracture interface wave standing along the fracture surfaces.

It should be noted that the symmetric mode of interface waves corresponds to the case when displacements across the fracture are symmetrical with respect to its axe.

Thus, for each specific position along the fracture, the fracture either expands or contracts. Then, as the wavelength of the fundamental mode wave is twice the fracture length, at each specific time the amplitude of the displacement in a direction normal to the fracture is either positive along the fracture, which corresponds to the fracture expansion, or negative, which corresponds to the fracture contraction. In accordance with the aforesaid, the velocity of this wave is rather low. Therefore, the fundamental mode can also be interpreted as the "fracture breathing". If such an interpretation is correct, the frequency-independent "acoustic wave speed" of the HIT method is to be close to the interface wave velocity at the fundamental frequency. Below it is shown, that this is the case indeed.

For the elliptical fracture the squared the HIT "acoustic wave speed" is (see U.S. Pat. No. 4,802,144, U.S. Pat. No. 4,783,769, U.S. Pat. No. 5,170,378)

$$a_{HIT}^2 = \frac{1}{2(1-\sigma)} \frac{\pi G w}{\rho_f H} f(H/L), \quad (17)$$

where G is the formation shear modulus, $\sigma$ is Poisson's ratio, $\rho_f$ is the fluid density, while w, H, L are the fracture width, height and length, respectively. f is a bounded function taking values between ½ and 1.

In accordance with the approach of the present invention the squared velocity is determined by equation (3) for the frequency specified by the following equation $$2L = \frac{c(v)}{v}.$$

In this case phase rather than group velocity is used since the frequency is known precisely. Solving equation (3) together with the latter equation one gets $$a_{fund}^2 = \frac{1}{2(1-\sigma)} \frac{\pi G}{\rho_f} \frac{w}{L}. \quad (18)$$

Equations (17) and (18) match if $$\frac{f(H/L)}{H/L} \approx 1,$$

which is reasonable when $H/L \approx 1$.

Thus, it has been demonstrated that the HIT method can be interpreted as the lowest-frequency truncation of the method according to the invention.

The method of the invention implies analysis of all frequencies of the fracture response. The higher modes of the fracture oscillations give rise to the response in the well analogously to the fundamental mode, which explains, according to the proposed interpretation, the higher-frequency peaks in the spectrogram of the fluid pressure oscillations in the injection well. In the presence of several peaks, there are more equations which could be used for more precise estimation of the fracture characteristic sizes, as well as for refinement of the properties of the considered system.

From U.S. Pat. No. 5,206,836 it follows that the HIT method is based on elastic waves in a fluid rather than on interface waves, at that it is implied that higher resonance modes (modes following the fundamental one) are harmonic, as dispersion of fluid elastic waves is negligible in a low-frequency range. The higher resonance modes observed in reality appear to be non-harmonic. In accordance with the approach of the present invention, the mentioned peaks are interpreted as corresponding to the higher modes of the fracture oscillations. The HIT-based approach provides no interpretation for said peaks.

Another preferred embodiment of the method of the present invention disclosed above with reference to FIG. 1 is determining characteristic sizes of a fluid-filled crack in a fluid-submerged part of a construction element, the fluid-filled crack intersecting a surface of the construction element fluid-submerged part. The construction element can be one of the following: a bridge pier, a marine platform pier, a building foundation, etc.

Since the crack intersects the element surface, its width w can be measured directly. The crack oscillations are registered by a transducer clamped at the intersection of the fluid-filled crack with the construction element surface. The crack oscillations are preferably excited prior to registration, for example, by a sudden deformation of the fracture edge.

The other operations on determining the crack characteristic sizes are analogous to the corresponding operations of the method for determining characteristic sizes of a crack in a subterranean formation, described above and representing the preferred embodiment of the method according to present invention. In accordance with these operations, frequencies of the standing interface waves propagating along the fluid-filled crack surfaces are determined as corresponding to the lowest resonance frequencies of the registered oscillations, the interface wave group velocity is calculated, which depends on the crack width w and properties of the construction element and fluid, and the crack characteristic size along the standing interface wave propagation is calculated based on equation (1), preferably taking equations (13) and (14) into account.

In accordance with the aforesaid, the described preferred embodiment of the method of the invention is also applicable for determining more than one characteristic size of the fluid-filled crack, as well as for determining characteristic sizes of several fluid-filled cracks.

Figure 6:
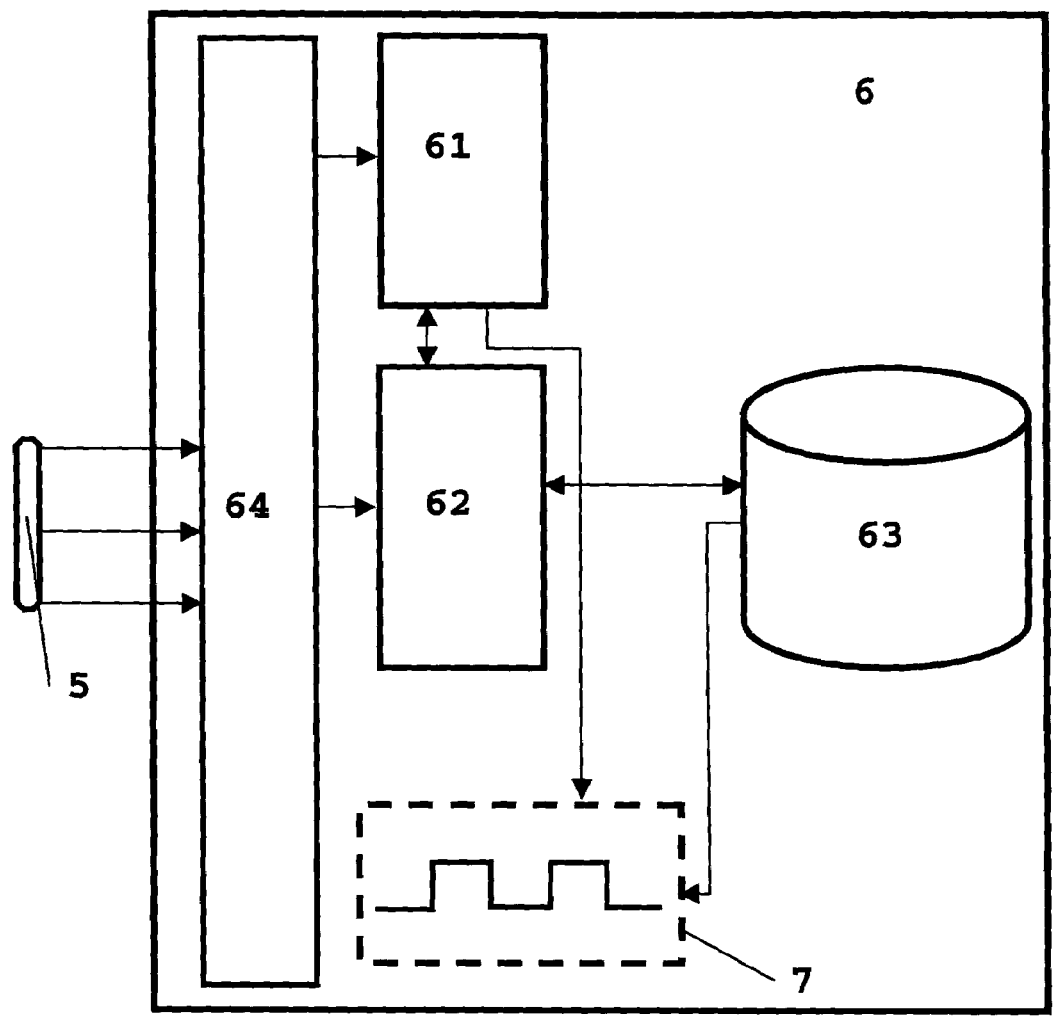
FIG. 6 schematically illustrates the data processing means of the system of FIG. 2.

Furthermore, for practical implementation of this preferred embodiment of the method of the invention applicable is the system similar to the system described in detail with references to FIGS. 2, 6, which includes the registration means 5, the data processing means 6 and the signal generation means 7. In the considered case, the registration means will likely differ from the registration means 5 of FIG. 2. However, the data processing means 6 and the signal generation means 7 or analogues thereof are applicable to the considered case. The basic steps of the above preferred embodiment of the method of the invention, which relate to simulation and calculations, are preferably coded in the form of computer-executable instructions executed by the data processing means 6, and the calculation results are transmitted in the form of a signal by the signal generation means 7 to a local or remote display device.

The registration of the lowest resonance frequencies generated by interface waves propagating along the fluid-filled crack surfaces allows a wide variety of applications.

Figure 7:
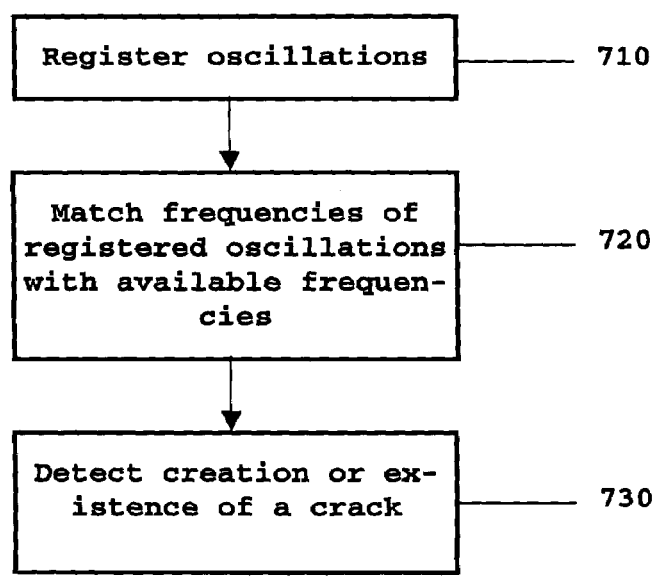
FIG. 7 is a flowchart of a method for detecting creation or existence of a fluid-filled crack in accordance with the invention.

One of such applications is the detection of creation or existence of a fluid-filled crack in a medium. Hereinbelow, with a reference to FIG. 7 described is a corresponding method for detecting creation or existence of a fluid-filled crack.

In step 710 oscillations of the medium are registered. The medium oscillations are preferably excited prior to the registration. The registration and excitation are carried out by any known suitable means or method described above.

Then in step 720 frequencies of the registered oscillations are matched with available frequencies of the medium oscillations in the absence of fluid-filled cracks. Said frequencies of the medium oscillations in the absence of fluid-filled cracks are determined in advance, for example, by measurements preformed in the medium areas wherein the absence of cracks is established reliably, or by mathematical modeling.

Then in step 730, in accordance with the results of matching the frequencies performed in step 720, the creation or existence of the fluid-filled crack in the medium is detected based on the presence of frequencies of the medium oscillations registered in step 710, which are significantly lower than the available frequencies of the medium oscillations. In accordance with the aforesaid, these low frequencies are determined by interface waves propagating along the fluid-filled crack surfaces.

The described method is also applicable for detecting more than one fluid-filled crack. By virtue of the data processing simplicity, this method can be implemented in real time.

The method for detecting creation or existence of a fluid-filled crack according to the present invention is applicable to cracks in subterranean formations (for example, in the shelf subterranean formation), cracks in fluid-submerged parts of construction elements like bridge piers, marine platform piers, building foundations, as well as cracks in bones of a human being or an animal.

For practical implementation of this preferred embodiment of the method of the invention applicable is the system similar to the system described in detail with references to FIGS. 2, 6, which includes the registration means 5, the data processing means 6 and the signal generation means 7. In the considered case, the registration means will likely differ from the registration means 5 of FIG. 2. However, the data processing means 6 and the signal generation means 7 or analogues thereof are applicable to the considered case. The basic steps of the above preferred embodiment of the method of the invention, which relate to analysis and interpretation, are preferably coded in the form of computer-executable instructions executed by the data processing means 6, and the results are transmitted in the form of a signal by the signal generation means 7 to a local or remote display device.

Figure 8:
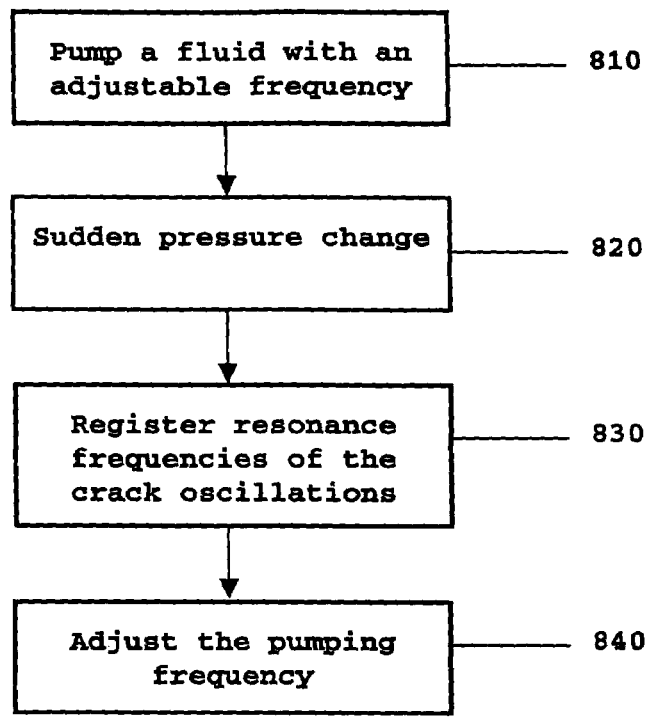
FIG. 8 is a flowchart of a method for hydraulic fracturing in a subterranean formation in accordance with the invention.

Registration of the lowest resonance frequencies generated by the interface waves propagating along the surfaces of fluid-filled cracks enables to improve the efficiency of hydraulic fracturing. Hereinbelow, with a reference to FIG. 8, described is an efficient method for hydraulic fracturing in a subterranean formation in accordance with the invention.

In step 810 a fluid is pumped into an injection well (for example, into the injection well 2 of FIG. 2) with an adjustable pumping frequency for creation and propagation of a fluid-filled crack in the formation (for example, crack 3 of FIG. 2). Pumping the fluid into the well can be carried out by the pump 8 via the conduit 9 of FIG. 2. The pumping frequency corresponds to the frequency with which the pump increases and decreases the fluid pressure in the injection well, thereby causing the fluid pressure oscillations.

In step 820 a sudden fluid pressure change is provided in the injection well, thereby exciting the crack oscillations. The sudden fluid pressure change is preferably provided by multiple quick stops of pumping.

In step 830 the resonance frequencies of the fluid-filled crack oscillations excited in step 820 are registered. The registration is carried out by any known suitable method or means described above. For example, the oscillations can be registered by the registration means 5 of FIG. 2.

In step 840 the pumping frequency is adjusted so that it matches one of the resonance frequencies of the fluid-filled crack oscillations registered in step 830. It should be noted, that pumping frequencies typically belong to the range of 0.1-2.0 Hz which covers the frequency range of the crack oscillations. Pumping the frequency with a resonance frequency of the fluid-filled crack accelerates the growth thereof.

Simplicity of the data processing inherent to the described method allows to practice it in real time.

In accordance with the aforesaid, one of the main aspects of monitoring of a fluid-filled crack consists in detection of a moment when the crack ceases to grow. Upon cessation of growth of an oscillating fluid-filled crack in a longitudinal direction, it begins to expand, i.e. its width increases. According to the approach described above, when the width increases the group velocity of the interface waves propagating along the crack surfaces increases, which yields, in accordance with equation (1), to increase of the resonance frequency of the fluid-filled fracture oscillations under constant longitudinal characteristic size of the crack.

Figure 9:
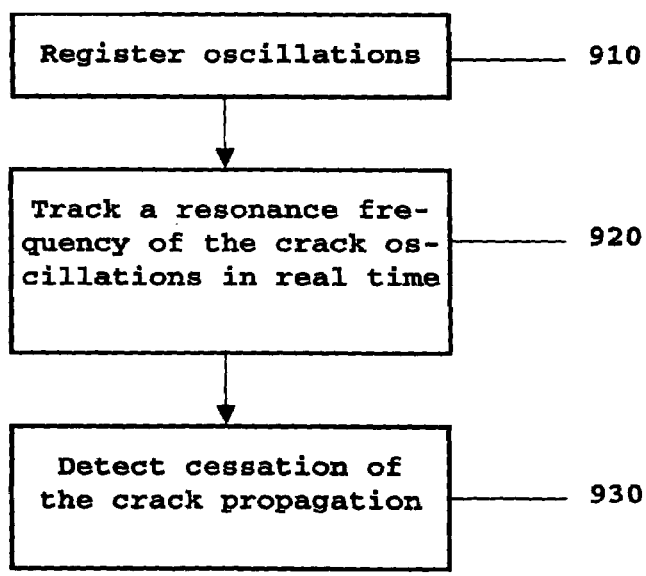
FIG. 9 is a flowchart of a method for detecting cessation of propagation of a fluid-filled crack in a medium in accordance with the invention.

Hereinbelow, with a reference to FIG. 9, described is a method for detecting cessation of propagation of a fluid-filled crack in a medium (tip screenout). In step 910 oscillations of the fluid-filled crack are registered, at that the fluid-filled crack oscillations are preferably excited prior to registration. The registration and excitation are carried out by any known suitable method or means described above.

Figure 10:
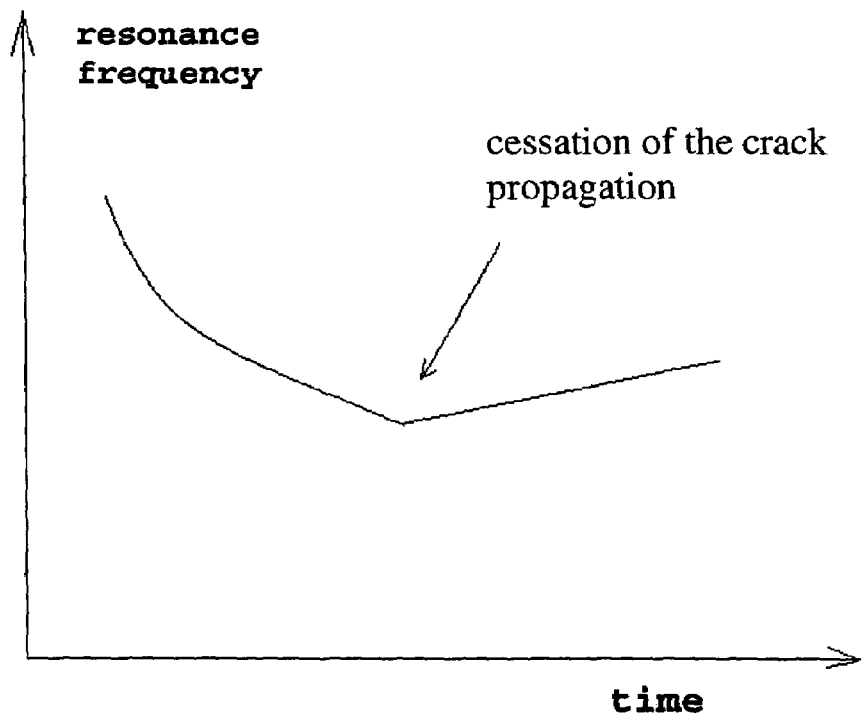
FIG. 10 illustrates a qualitative change, when the monitored resonance frequency of the fluid-filled fracture oscillations ceases to decrease with time and begins to increase.

In step 920 a resonance frequency of the fluid-filled crack oscillations is tracked in real time. In step 930, in accordance with the aforesaid, the cessation of the fluid-filled propagation is detected by detecting a switch when the resonance frequency being tracked in step 920 ceases to decrease with time and begins to grow. An example of such a qualitative change is presented in the plot of FIG. 10.

The method described above is applicable for various media including, for example, bones of a human being or an animal; subterranean formations (in particular, the shelf subterranean formation) and in this case for practicing this method the system of FIGS. 2, 6 is applicable with possible modifications; fluid-submerged parts of construction elements such as bridge piers, marine platform piers, building foundations.

Various crack propagation regimes were devised theoretically in *Reservoir Stimulation*, Third Edition, 2000, eds. M. J. Economides and K. G. Nolte, John Wiley & Sons, Ltd. As a matter of fact, for a constant pumping rate, each scenario is characterized by formulae like $$L(t) \sim t^q$$
$$w(t) \sim t^{\frac{q}{4}},$$

for some q>0. Using these formulae and equations (1), (13), one can derive the following time dependence of the resonance frequency for each specific scenario $$v(t) \sim L^{-\frac{3}{2}} w^{\frac{1}{2}} \sim t^{-\frac{11}{8}q}.$$

Thus, tracking evolution of the resonance frequency can provide information about the fracture propagation regime.

The approach to monitoring of fluid-filled domains based on interface waves propagating along their surfaces according to the invention is applicable not only to fluid-filled cracks in various media. In particular, this approach can be applied to monitoring of fluid-filled layers in various media, preferably in subterranean formations (for example, in the shelf subterranean formation). In this case the principal aspect of monitoring is determining physical properties of a fluid filling a layer (preferably, viscosity and density) and physical properties of a medium surrounding the layer (preferably porosity and permeability), as well as determining the layer geometry (preferably, thickness).

As the layer is inherently very extensive, which allows to consider it infinite in simulation, analysis of its oscillations based on standing interface waves propagating along the surfaces thereof is inapplicable. Interpretation of the fluid-filled layer oscillations is performed based on running waves propagating along the surfaces thereof.

Figure 11:
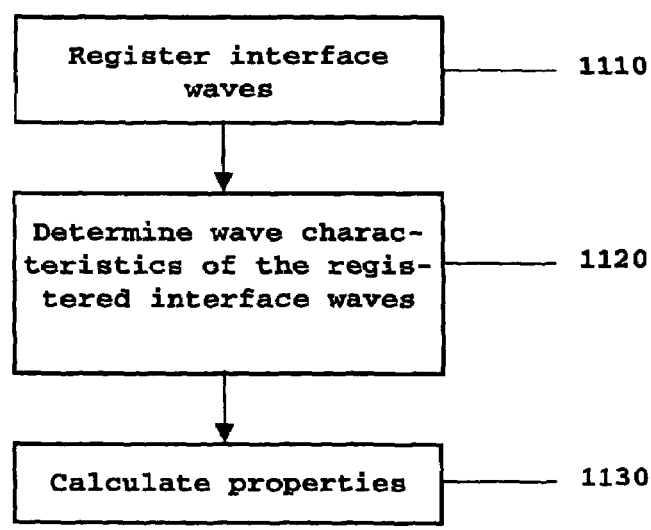
FIG. 11 is a flowchart of a method for determining properties of a fluid filling a layer in a medium, of the medium and of the layer in accordance with the invention.

Hereinbelow, with a reference to FIG. 11, described is a method for determining properties of a fluid filling a layer in a medium, of the medium and of the layer according to the invention. In step 1110 interface waves propagating along the fluid-filled layer surfaces are registered, said interface waves being preferably excited prior to registering thereof. The registration and excitation are carried out by any known suitable means or method described above.

In step 1120 wave characteristics of the registered interface waves are determined. Preferably, said wave characteristics represent dependencies of velocities of the registered interface waves on frequency.

In step 1130 the properties of the fluid, the medium and the fluid-filled layer are calculated based on the wave characteristics of the interface waves determined in step 1110. In step 1130 the interface wave velocities determined in step 1120 are preferably matched to velocities calculated based on model equations, whereto the required properties and the interface wave frequencies determined in step 1120 enter. Then the required properties are determined based on said model equations using the interface wave frequencies determined in step 1120.

The method described above can be applied to exploration of water-bearing and oil bearing layers and determination of basic parameters thereof. For practical implementation of this method applicable is the system similar to the system described in detail with references to FIGS. 2, 6, which includes the registration means 5, the data processing means 6 and the signal generation means 7. In the considered case, the registration means will likely differ from the registration means 5 of FIG. 2 since, in accordance with the aforesaid, it should be more sensitive. However, the data processing means 6 and the signal generation means 7 or analogues thereof are applicable to the considered case. The basic steps of the described method of the invention, which relate to simulation and calculations, are preferably coded in the form of computer-executable instructions executed by the data processing means 6, and the calculation results are transmitted in the form of a signal by the signal generation means 7 to a local or remote display device.

The invention has been disclosed above with a reference to specific embodiments thereof. Other embodiments of the invention, which do not modify the subject matter thereof as it is disclosed herein, will be obvious to the ones skilled in the art. Accordingly, the invention is implied to be limited in its scope only by the claims as given below.

What is claimed is:

1. A method for determining characteristic sizes of at least one fluid-filled crack in a medium, the method comprising the steps of:
   registering oscillations of the at least one fluid-filled crack;
   selecting lowest resonance frequencies from the registered oscillations;
   determining frequencies $v^{(n)}$ (n is integer) of standing interface waves propagating along surfaces of the at least one fluid-filled crack as corresponding to the selected resonance frequencies; and
   calculating the characteristic sizes of the at least one fluid-filled crack based on the determined frequencies $v^{(n)}$ of the standing interface waves and taking properties of the medium and the fluid into account.

2. The method of claim 1, further comprising the step of exciting the at least one fluid-filled crack oscillations prior to registering thereof, wherein the steps of the method are performed in real time.

3. The method of claim 1, wherein the medium is a subterranean formation, a crack mouth is adjacent to an injection well, and a crack width w is determined separately from other characteristic sizes thereof, and wherein:
   the step of registering is based on registering fluid pressure oscillations in the injection well; and
   the step of calculating comprises calculating an interface wave group velocity $V(v^{(n)},w)$ which further depends on properties of the formation and the fluid; and calculating a characteristic size L along the standing interface wave propagation in accordance with the following formula $$\frac{L}{n} = \frac{V(v^{(n)}, w)}{2v^{(n)}}.$$

4. The method of claim 3, further comprising the step of exciting oscillations of the at least one fluid-filled crack prior to registering thereof, wherein said oscillations of the at least one fluid-filled crack are excited by a sudden fluid pressure change in the injection well, said sudden fluid pressure change in the injection well being provided by a rapid cessation of pumping.

5. The method of claim 3, wherein the interface wave group velocity $V(v^{(n)},w)$ is determined either assuming, that the fluid is a non-viscous fluid, or assuming that the fluid is a viscous Newtonian fluid.

6. The method of claim 3, wherein the lowest resonance frequency v of oscillations of the at least one fluid-filled crack is determined and the maximum distance L between the crack edges is estimated as a characteristic size thereof in accordance with the following formula $$L = \frac{V(v, w)}{2v}.$$

7. The method of claim 3, wherein the formation and fluid properties, on which the interface wave group velocity depends, are refined based on the determined standing interface wave frequencies, the formation properties including porosity and permeability and the fluid properties including viscosity, the at least one fluid-filled crack being either a natural crack or an artificially-made crack, and, wherein the subterranean formation is a shelf subterranean formation.

8. The method of claim 3, wherein the crack width is either determined a priori by measurements, said measurements being implemented by at least one tilt-meter, or determined based on matching a known volume of the pumped fluid with a model estimation of the crack volume.

9. The method of claim 3, wherein oscillations of the at least one fluid-filled crack are registered by at least one transducer clamped in the vicinity of the at least one fluid-filled crack, said at least one transducer being clamped inside the injection well, or by registering oscillations of either natural or artificially-made objects, the oscillations being induced by oscillations of the at least one fluid-filled crack, or by registering at least one natural phenomenon, induced by oscillations of the at least one fluid-filled crack, said at least one natural phenomenon including gravitational, electromagnetic, seismo-electric, optical, thermodynamic, and electro-kinetic phenomena.

10. The method of claim 1, wherein the medium is a fluid-submerged part of a construction element, the at least one fluid-filled crack intersects a surface of the construction element fluid-submerged part, and a crack width is measured directly, and wherein:

the step of registering comprises clamping a transducer at the intersection of the at least one fluid-filled crack with a surface of the construction element fluid-submerged part, and registering oscillations by said transducer, the step of calculating comprises calculating an interface wave group velocity $V(v^{(n)},w)$ which further depends on properties of the construction element and the fluid and calculating a characteristic size L along the standing interface wave propagation in accordance with the following formula $$\frac{L}{n} = \frac{V(v^{(n)}, w)}{2v^{(n)}}.$$

11. The method of claim 10, further comprising the step of exciting the at least one fluid-filled crack oscillations prior to registering thereof, wherein said at least one fluid-filled crack oscillations are excited by a sudden deformation of a crack edge.

12. The method of claim 10, wherein the construction element is one of the following: a bridge pier, a marine platform pier, or a building foundation, and wherein the at least one fluid-filled crack is either a natural crack or an artificially-made crack.

13. A system for determining characteristic sizes of at least one fluid-filled crack in a subterranean formation in accordance with the method of claim 3, the system comprising:
  registration means for registering fluid pressure oscillations in an injection well;
  data processing means for determining frequencies of standing interface waves propagating along surfaces of the at least one fluid-filled crack, calculating an interface wave group velocity, and calculating a characteristic size of the at least one fluid-filled crack along the standing interface wave propagation; means for generating a signal comprising results of the calculations.

14. The system of claim 13, further comprising means for pumping a fluid into the injection well to excite oscillations of the at least one fluid-filled crack, wherein the registering means are clamped in a vicinity of the crack mouth, the signaling means transmits the generated signal either to a local display device or to a remote display device, and the data processing means and the signaling means are integrated into a single device.

15. A method for determining properties of a fluid filling a layer in a subterranean formation, of the subterranean formation and of the layer, the method comprising the steps of:
  registering interface waves propagating along surfaces of the fluid-filled layer;
  determining frequencies and velocities of the registered interface waves; and
  calculating the properties of the fluid, the subterranean formation and the fluid-filled layer based on the determined frequencies and velocities of the interface waves.

16. The method of claim 15, further comprising the step of exciting the interface waves propagating along the fluid-filled layer surfaces prior to registering thereof.

17. The method of claim 15 or 16, wherein the subterranean formation is a shelf subterranean formation, and wherein the fluid-filled layer property is a width thereof, the fluid properties are viscosity and density, and the subterranean formation properties are porosity and permeability, and wherein the step of calculating comprises
  matching the determined velocities with the velocities calculated based on model equations which contain terms corresponding to the interface wave frequencies and the required properties enter, and
  determining the required properties based on said model equations using the determined interface wave frequencies.

* * * * *